United States Patent [19]

Casutt et al.

[11] 4,257,158

[45] Mar. 24, 1981

[54] BUS SUSPENSION MATING FIXTURE ASSEMBLY

[75] Inventors: Max Casutt, San Diego; George R. Heffner, La Verne, both of Calif.

[73] Assignee: Grumman Flexible Corporation, Delaware, Ohio

[21] Appl. No.: 24,506

[22] Filed: Mar. 28, 1979

[51] Int. Cl.$^3$ .............................................. B23P 19/04
[52] U.S. Cl. .................................. 29/824; 29/281.4; 29/281.5; 29/469; 254/45
[58] Field of Search ................. 29/822, 823, 824, 791, 29/793–797, 469, 281.4, 281.5, 256; 296/178; 254/2 R, 2 B, 2 C, 45–50

[56] References Cited

U.S. PATENT DOCUMENTS

2,571,572  10/1951  Harmon ............................ 29/230 X
4,033,033   7/1977  Heffner ................................. 29/824

Primary Examiner—Carl E. Hall
Attorney, Agent, or Firm—Charles C. Logan, II

[57] ABSTRACT

A bus suspension mating fixture assembly having a bus body overhead support assembly and a bus suspension shuttle assembly. The bus body overhead assembly comprises an elongated framework having a first pair of laterally spaced upright side beams connected together adjacent their tops by a transverse beam and a second pair of laterally spaced upright side beams connected together adjacent their tops by a transverse beam, and a pair of laterally spaced longitudinal beams that have their opposite ends connected to the upright side beams adjacent their tops. A pair of laterally spaced longitudinal overhead support rails are supported from the top of the bus body overhead support assembly and the overhead support rail unit can be raised and lowered throughout a predetermined range. The bus suspension shuttle assembly comprises a shuttle platform and structure for reciprocally moving the shuttle platform laterally into position within the confines of the bus body overhead support assembly and back out to a loading position where a bus front suspension assembly and a bus rear suspension assembly are loaded onto the shuttle platform.

17 Claims, 10 Drawing Figures

BUS SUSPENSION MATING FIXTURE ASSEMBLY

BACKGROUND OF THE INVENTION

Until recently, it has been the general practice in the construction of buses and other transit vehicles, to build them piece-by-piece, wherein a skeleton framework usually referred to as a "bird-cage," is erected on a vehicle floor structure, after which the vehicle side walls and roof are completed, and then the interior of the vehicle is finished by workers therein, passing the necessary material, such as liners, doors, windows, fixtures, seats, paints, carpeting, etc., in through the door and window openings of the vehicle.

U.S. Pat. No. 3,827,137 to T. C. Schubach, discloses and claims a method of manufacturing a transit vehicle by completing, in individual jigs, sub-assemblies of a transit vehicle, including a floor assembly, side wall assemblies, a roof assembly, and a front end assembly, and then assembling these completed sub-assemblies to provide a substantially completed vehicle.

In U.S. Pat. No. 4,033,033 to G. R. Heffner, a bus manufacturing mechanism and method is described which provides a trackway on each of selected ones of the sub-assemblies, and employing a traveling collector, having a plurality of conveyor ways therein, with each of which is a track-way of one of the selected sub-assemblies is adapted to be aligned. The conveyor ways are so located and adjusted that the selected sub-assemblies are conveyed there along from their respective jigs into the collector, and into positions of final assembly with each other, where they are secured.

The present invention is based on the general concepts of the two patents described above, but goes beyond them in providing a bus suspension mating fixture assembly into which the body shell of the transit vehicle is carried along overhead support rails prior to its being lowered onto the properly positioned front and rear bus suspension assemblies.

SUMMARY OF THE INVENTION

The novel bus suspension mating fixture assembly plays an essential role in the assembly of a transit vehicle such as a bus. The stage at which the bus is in its assembly process when it reaches the novel bus suspension mating fixture assembly is that of a completed upper body of the bus. In other words, the floor, the roof, both side walls, and the front and rear walls of the body have all been assembled together. The interior of the bus has also been completely finished and the only thing lacking is the front and rear suspension assemblies.

The assembled bus body is brought into the mating fixture assembly in the state above described by having it travel along the overhead rail conveyor assembly. Once in its proper position therein, a shuttle platform carrying the front and rear suspension assemblies in their properly spaced positions is drawn laterally into position within the confines of the bus body overhead support assembly directly beneath the bus body being suspended from the overhead rail conveyor assembly. Next the overhead support rails are lowered to properly position the bus body onto the front and rear bus suspension assemblies. After all attachments have been secured between the bus body and the suspension assemblies, the lift-bar cradles have their cables secured between the lift-bar cradles and the overhead support rail. The completely assembled bus is then raised upwardly as a complete unit a sufficient distance to allow the shuttle platform to be withdrawn from thereunder. The completely assembled bus is then lowered to ground level, started up, and driven out of the lift-bar cradles and out of the vehicle mating fixture assembly. At this point the lift-bar cradles are removed from a position within the bus body overhead support assembly and the whole operation of assembling a new bus can be started again.

DESCRIPTION OF THE DRAWINGS

The objectives and advantages of the invention will be apparent from the following description and the accompanying drawings, wherein:

FIG. 5a is a top plan view of FIG. 4a;

DESCRIPTION OF THE PREFERRED EMBODIMENT

Figure 1:
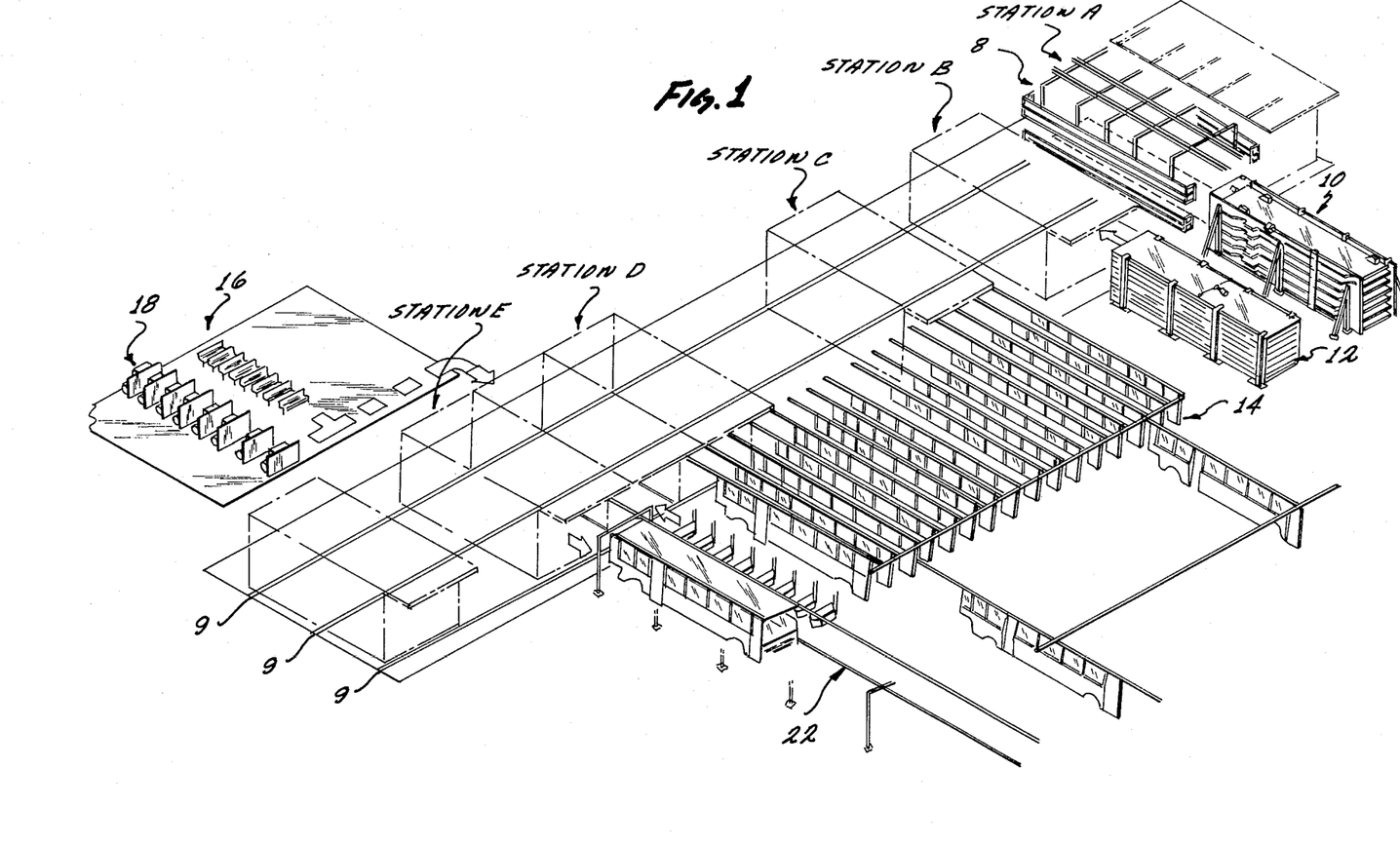
FIG. 1 is a perspective schematic illustration of the production flow process for assembling the bus body into a unitary member from a plurality of sub-assemblies.

Referring now to FIG. 1, the process of assembling a bus body will now be described. A traveling collector such as described in U.S. Pat. No. 4,033,033 is generally designed at numeral 8. During the bus assembly process collector 8 travels back and forth laterally along rails 9. At station A, floor sub-assembly 10 is loaded into the collector in its proper position. Next collector 8 travels to station B, where roof sub-assembly 12 is loaded therein, in its proper position. Following this the collector travels to station C where roadside sidewall sub-assembly 14 is loaded into the collector. The collector then travels to station D where the curbside sidewall sub-assembly is loaded therein. When the collector is moved on to station E, the joints between the previously loaded sub-assemblies are connected and closed, and injected with the proper adhesives. Also, at station E, rear seat 16, front components 17, and air conditioning sub-assembly 18 are attached in their proper positions in the bus body.

Figure 2:
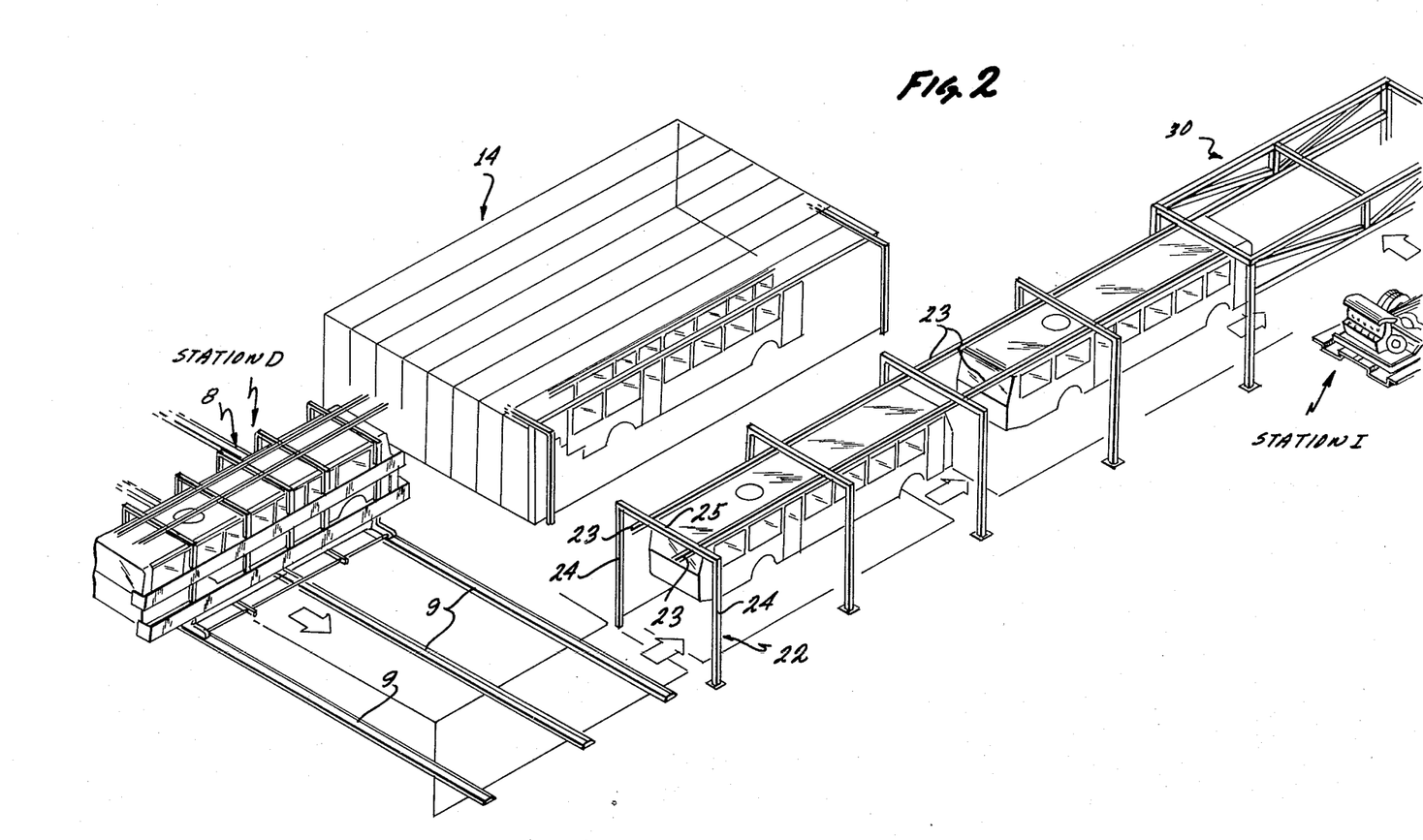
FIG. 2 is a perspective schematic view illustrating how the completed bus body is transferred to the bus suspension mating fixture assembly.

Following the above operations, the bus body is attached by its upper structure to the overhead conveyor assembly 22. Looking at FIG. 2, overhead rail conveyor assembly 22 is seen to have a plurality of upright side beams 24 with transverse top beams 25 having their opposite ends attached to the top of upright side beams 24. Suspended from transverse top beams 25 are longitudinal overhead support rails 23. Continuing along the bus assembly process, the bus body is transported along overhead support rails 23 to station I where bus suspension mating fixture assembly 30 is found.

Figure 2A:
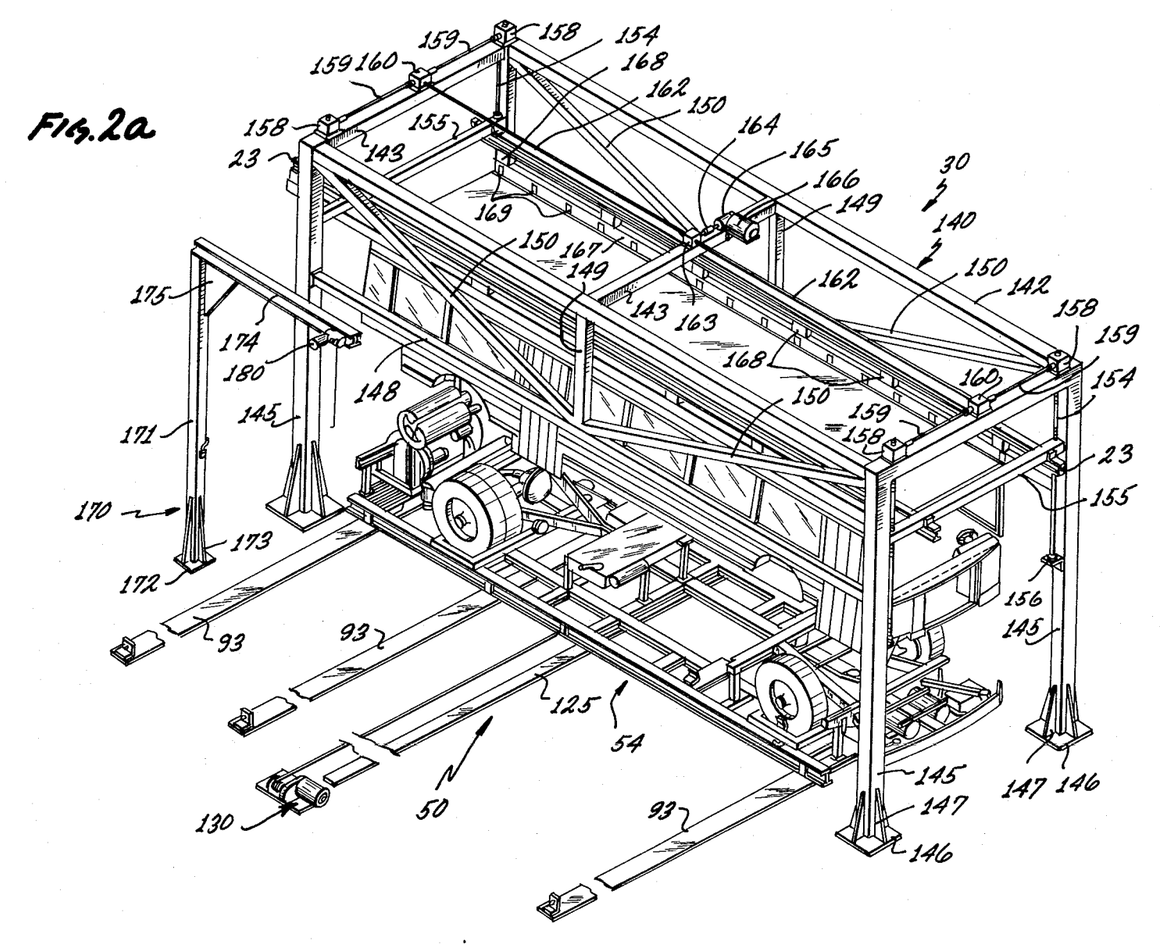
FIG. 2a is a perspective view illustrating the novel bus suspension mating fixture assembly.

In FIG. 2a, bus suspension mating fixture assembly 30 is illustrated in more detail. It is at this station that the front and rear bus suspension assemblies are attached to the under side of the bus body, thus completing the assembly of the bus. The structure of bus suspension mating fixture assembly 30 will be described in detail later.

Figure 3:
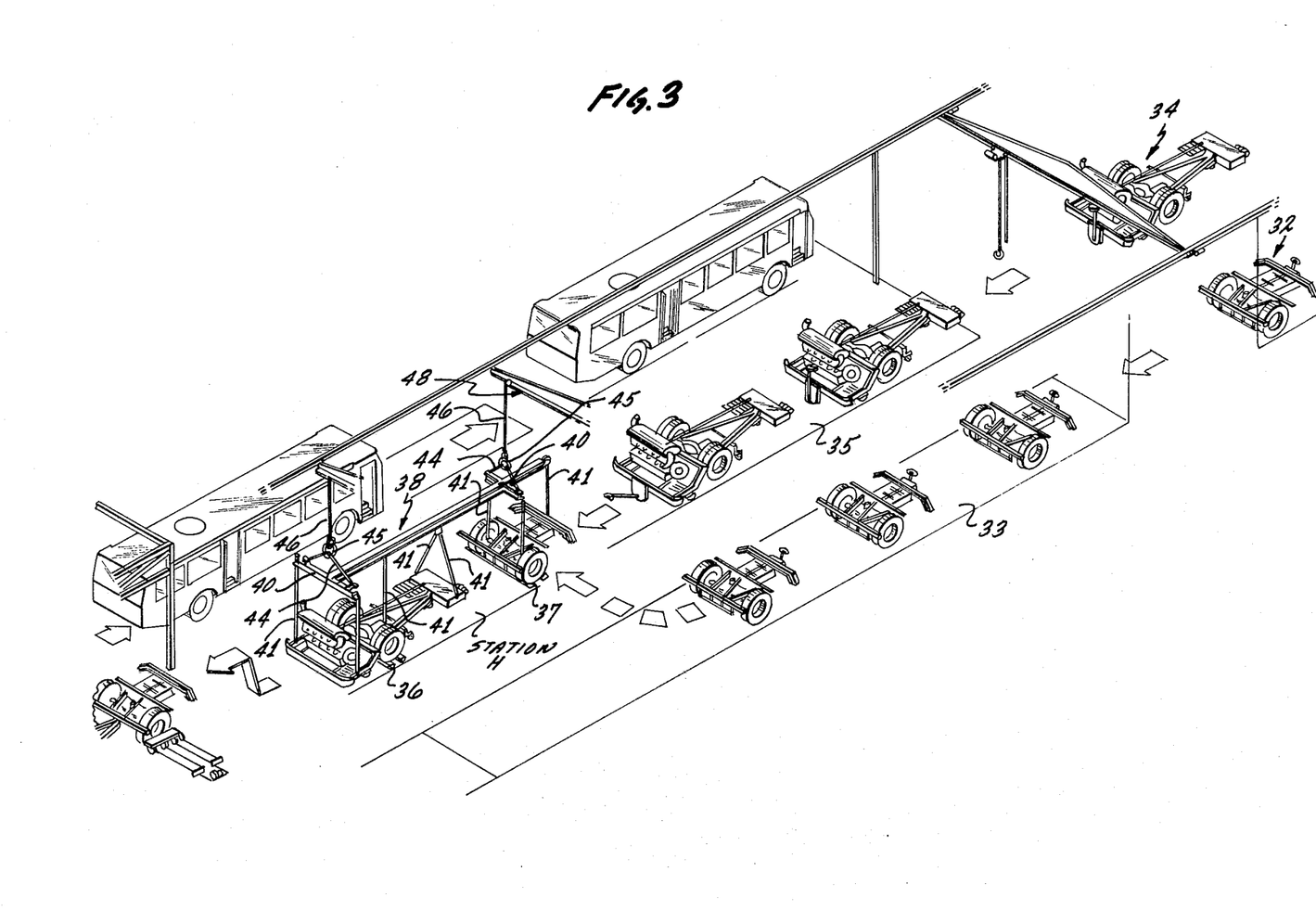
FIG. 3 is a schematic perspective view illustrating the sequence of operations that are involved in taking the front bus suspension assembly and the rear bus suspension assembly to the bus suspension mating fixture assembly.

The operations that are performed prior to the front and rear bus suspension assemblies being positioned within the mating fixture assembly 30 are illustrated in FIG. 3. Front bus suspension assembly 32 is initially taken to staging area 33 and bus rear suspension assembly 34 is initially taken to staging area 35. From this point rear suspension assembly 35 is taken to station H where its wheels are positioned within aligning blocks 36. Next front suspension assembly 32 is taken to station H and its wheels positioned within aligning blocks 37. At this point attaching members 41 of lifting jig 38 are secured to the respective front and rear suspension assemblies. Lifting jig 38 has a longitudinal beam 39 and two transverse beams 40 at its opposite ends. Extending downwardly from the lifting jig are attaching members 41 mentioned previously. Lifting chains 44 are attached at the opposite ends of transverse beams 40 and intermediate their ends they pass through a hook 45 extending downwardly from the bottom of cable 46. Cables 46 are attached at their top ends to a pair of overhead cranes 48 that carry the lifting jig to station I where the front and rear bus suspension assemblies are unloaded onto shuttle platform 54 of the bus suspension shuttle assembly 50.

Figure 4A:
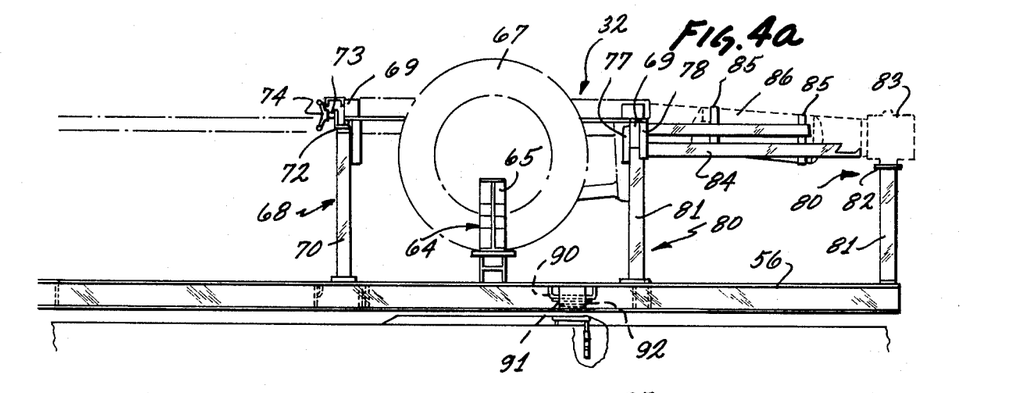
FIG. 4a is a side elevation view of the forward portion of the bus suspension shuttle assembly.

The structure of shuttle platform 54 will be discussed by referring to FIGS. 4 and 5 of the drawings. The shuttle platform is in the form of a frame having a plurality of laterally spaced longitudinal beams 56 that are interconnected by transversely extending major crossbeams 58 and minor crossbeams 60. Crossplates 62 have their opposite ends welded to the top of a pair of spaced longitudinal beams 56 and these crossplates 62 provide a mounting surface for front wheel locator units 64. The top part of front wheel locator unit 64 is a wheel guideplate 65 that aids in directing the bus tire 67 into its proper position. The lift-bar cradles later provide a lifting structure for the wheels of the bus when completely assembled.

Bus front suspension assembly locators 68 extend upwardly from the top of minor crossbeam 60. They consist of tubular supports 70 having a bracket 72 mounted at their top upon which crossbeam 69 of bus front suspension assembly 32 rests. Threaded rods 73 pass through brackets 72 and have a handle 74 for tightening the threaded rod against the frame crossbeam 69 for securing it in position.

Bus front suspension assembly supports 80 are mounted forwardly of tires 67 and extend upwardly from minor crossbeams 60. These supports 80 comprise a tubular member 81 which has mounted at its top an upright plate 77 and an upright plate 78 that capture between them another frame crossbeam member 69 of the front suspension assembly.

Extending forwardly from front crossbeam 69 are bumper support arms 84 that are connected at their forward ends to bus bumper 83. Mounting brackets 85 are attached to the bumper support arms for holding air reservoir 86. The most forwardly positioned bus front suspension assembly support 80 has a tubular post 81 with a plate 82 positioned at its top which supports the bus bumper 83.

Mounted on the underside of shuttle platform 54 are a plurality of roller bracket mounting plates 90. Roller brackets 91 are mounted on their bottom surface and have rollers 92 attached thereto. As the shuttle platform 54 is moved inwardly into position and outwardly from beneath bus body overhead support assembly 140, rollers 92 travel along rail plates 93. At the opposite ends of each of the roll plates 93 are found shock absorber units 94 secured to mounting brackets 95.

Looking now to FIGS 4c and 5c, the rear portion of shuttle platform 54 will be described. It is on this portion that bus rear suspension assembly 34 is positioned. The basic framework for the shuttle platform 54 has been described previously and extending upwardly therefrom are a pair of laterally spaced rear locator assemblies 100. These rear locator assemblies have a post 101 having a bracket 102 mounted at their top. Post brace 103 adds rigidity to the rear locator assembly structure. The wheels of the rear suspension assembly are guided into wheel locator units 64 by wheel guide plates 65. The rear suspension assembly has an engine support frame 105 upon which is mounted engine 106. The forward portion of engine support frame 105 rests on bracket 102, and the rear portion of the engine support frame rests on rear support stand 110 which is comprised of a tubular support 111 having a bracket 112 mounted at its top through which extend threaded rods 113 and 115. By turning handles 114 and 116 of the respective threaded rods, the threaded rods can be brought into engagement with transverse frame member 107 of the rear suspension assembly for holding it in its proper position.

Figure 4B:
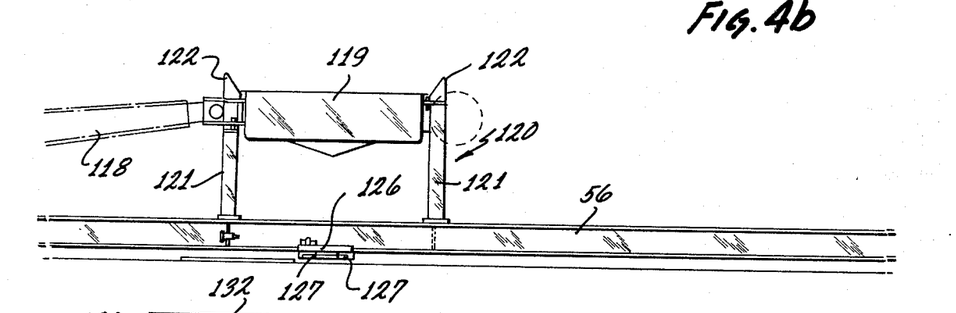
FIG. 4b is a side elevation view of the middle portion of the bus suspension shuttle assembly.
Figure 4C:
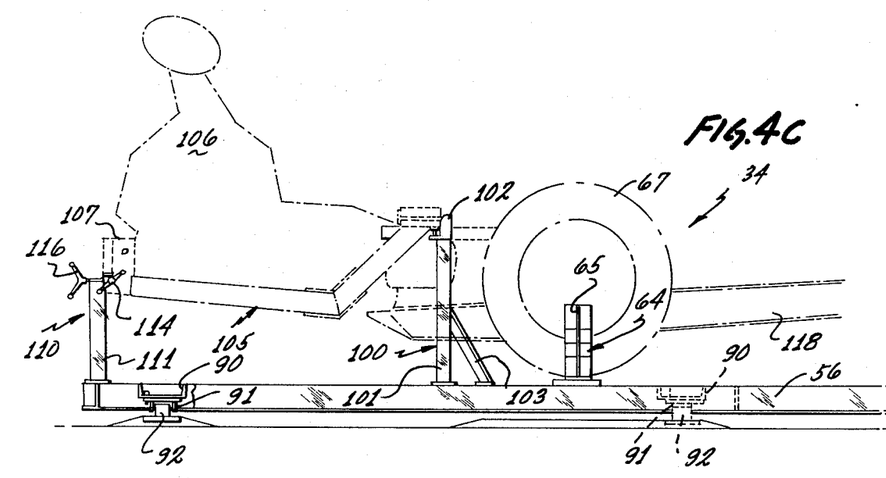
FIG. 4c is a side elevation view of the rear portion of the bus suspension shuttle assembly.
Figure 5A:
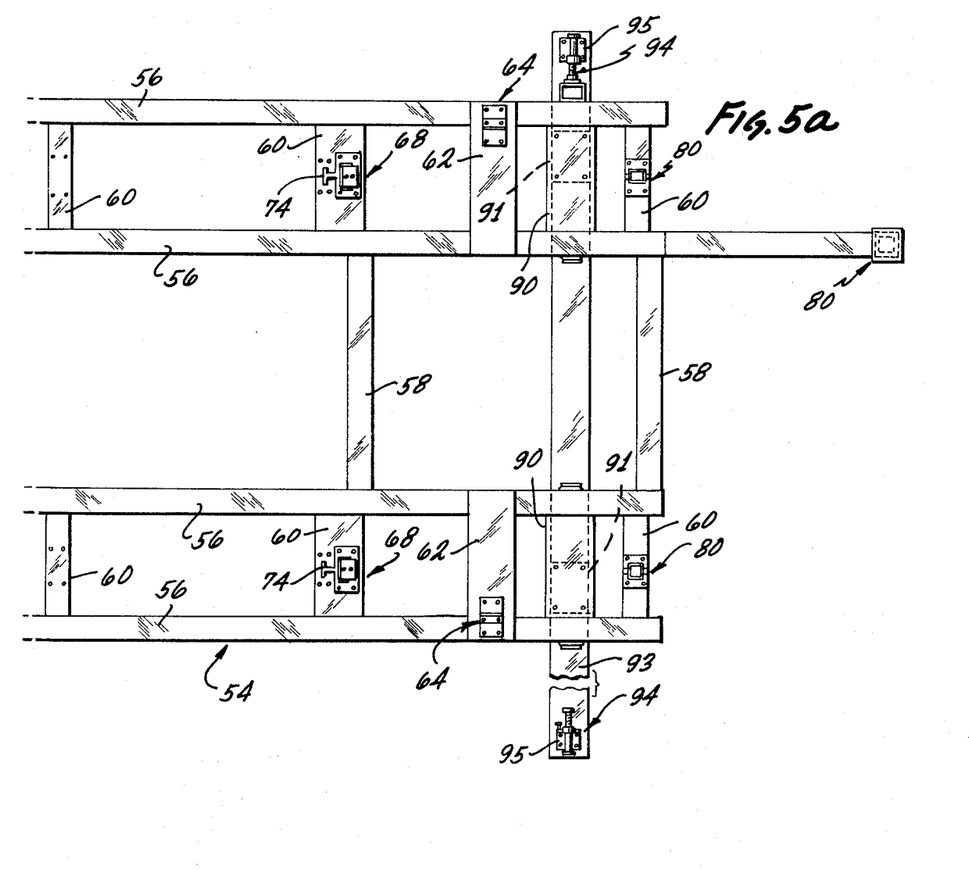
Figure 5B:
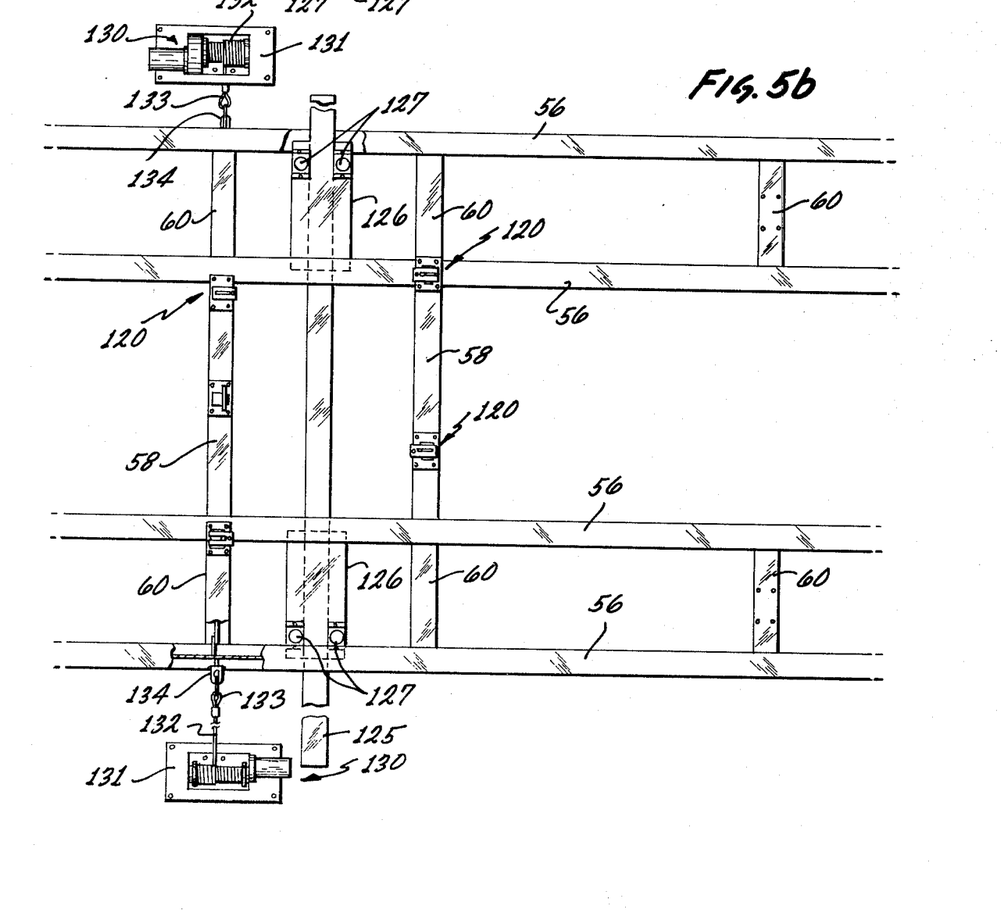
FIG. 5b is a top plan view of FIG. 4b.
Figure 5C:
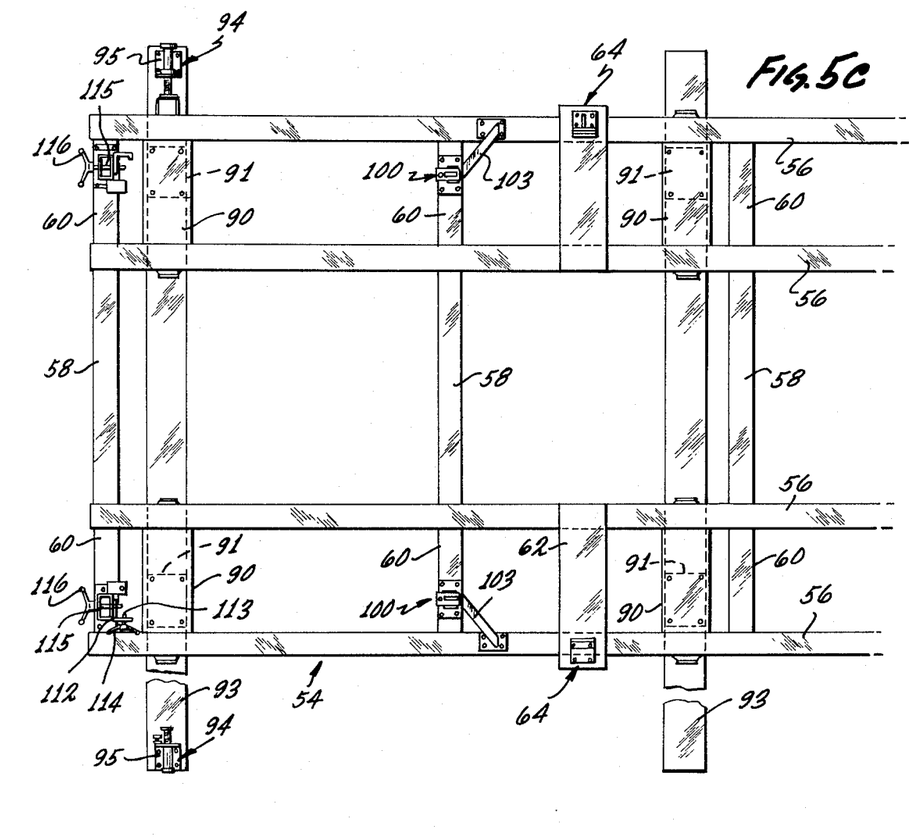
FIG. 5c is a top plan view of FIG. 4c.

The forward portion of the rear suspension assembly 34 has a tongue 118 whose front end is bolted to fuel tank bolster 119 (see FIGS. 4b and 5b). Fuel tank bolster 119 is positioned and supported by locator assemblies 120. These locator assemblies consist of post members 121 extending upwardly from the crossbeam members of the shuttle platform. At the top of the post 121 are found guide members 122 for directing the fuel tank bolster into its proper position.

Mounted transversely beneath the central portion of shuttle platform 54 is a guide plate 125. It interacts with guide rollers 127 that are attached to mounting plates 126 secured to the underside of the shuttle platform 54. This structure ensures that the shuttle platform will maintain its alignment as it is caused to travel into position beneath the overhead support assembly 140 and back outwardly to its loading position at its other extreme position.

The structure for moving the shuttle platform 54 between its loading position and its unloading position consists of a pair of power winches 130 mounted on base plates 131 on opposite lateral sides of shuttle platform 54. Each of these power winches have a cable 132 with a ring loop 133 at its end that is secured to a cable attaching bracket assembly 134 mounted upon the outer surface of longitudinal beams 56.

The bus body overhead support assembly is best illustrated in FIG. 2a. The overhead support assembly 140 has a pair of laterally spaced top longitudinal beams 142 whose opposite ends are attached to transverse top beam members 143. Supporting this structure are a plurality of upright side beams 144 that are mounted on base plates 146 and have ribbed brace members 147 to give them additional structural support. Lower longitudinal beams 148 are also connected between upright side beam 145 and along with upright brace member 149 and diagonal brace members 150 structurally reinforce the overhead support assembly 140.

Longitudinal support rails 23 have transverse members 155 attached to them. The plurality of jack screw units 154 pass through the outer extremities of transverse members 155 and have their opposite ends secured in support brackets 156 at the bottom and in gear box units 158 at their top. In response to the rotational movement of the jack screws, the overhead support rails can be raised and lowered through a predetermined range as required. In order to insure that the jack screw units operate simultaneously they are connected together by transverse drive shafts 159, gearbox units 160, longitudinal drive shafts 162, gearbox units 163, transverse drive shaft 164, gear reducer 165 and are ultimately driven by motor 166.

The structure for supporting the bus body shell as it is transported into the overhead support assembly 140 consists of a pair of laterally spaced longitudinal overhead bus support beams 167 having vertical support arms 168 extending upwardly therefrom. Rollers attached at the top of the support arms 168 travel along the overhead support rails 23. A plurality of longitudinally spaced support arms 169 extend inwardly from the overhead bus support beams 167 and are captured beneath structure of the bus body where the sidewalls are attached to the top unit. In this manner the bus body can be taken out of collector 8 after it has been assembled from its sub-assemblies and hung by its top structure by longitudinal overhead bus support beams 167. The bus body is then conveyed into the bus body overhead support assembly at which time the shuttle platform loaded with both the front and rear bus suspension assemblies is slid into position beneath the bus body. Next the bus body is lowered a predetermined distance so that it may be secured to the bus suspension assemblies. Following this cables are attached to the lift-bar cradles and the assembled bus is raised upwardly a predetermined distance. At this time the shuttle platform is withdrawn from beneath the completely assembled bus after which time the bus is lowered to ground level. The engine is then started and the bus is driven out through the end of the overhead support assembly 140. The last step would be to remove the lift-bar cradles by the use of the overhead lift assemblies 172. These consist of an upright beam 171 attached to the top of a base plate 172 and having rib brace members 173. A horizontal beam 174 extends from the top of upright beam 171 and is braced by member 175 for structural strength. Winches 180 are used to pick up the lift-bar cradle units so that they may be returned to the top surface of shuttle platform 54. At this point the assembly of a new bus will start all over again.

What is claimed is:

1. A bus suspension mating fixture assembly comprising:
    a bus body overhead support assembly, and
    a bus suspension shuttle assembly comprising a shuttle platform and means for reciprocally moving said shuttle platform laterally into position beneath said bus body overhead support assembly and back out to a loading position where a bus front suspension assembly and a bus rear suspension assembly are loaded onto said shuttle platform.

2. A bus suspension mating fixture assembly as recited in claim 1 wherein said bus body overhead assembly comprises an elongated framework having a first pair of laterally spaced upright side beams connected together adjacent their tops by a transverse beam and a second pair of laterally spaced upright side beams connected together adjacent their tops by a transverse beam, a pair of laterally spaced longitudinal beams have their opposite ends connected to said upright side beams adjacent their tops.

3. A bus suspension mating fixture assembly as recited in claim 2 wherein said bus body overhead assembly further comprises a pair of laterally spaced longitudinal overhead support rails supported from the top of said overhead support assembly.

4. A bus suspension mating fixture assembly as recited in claim 3 wherein said laterally spaced overhead support rails are connected together by a plurality of transverse members so that said overhead support rails move as a unitary member.

5. A bus suspension mating fixture assembly as recited in claim 3 wherein said bus body overhead assembly further comprises means for raising and lowering said overhead support rails through a predetermined range.

6. A bus suspension mating fixture assembly as recited in claim 5 wherein said means for raising and lowering said overhead support rails comprises at least four vertically oriented jack screw units.

7. A bus suspension mating fixture assembly as recited in claim 6 wherein each of said jack screws has its top end connected to one of said transverse beams and its bottom end connected to a support bracket attached to one of said upright side beams.

8. A bus suspension mating fixture assembly as recited in claim 7 further comprising motor means connected to each of said jack screws so that they can be actuated simultaneously.

9. A bus suspension mating fixture assembly as recited in claim 1 further comprising means on said shuttle platform for positioning and supporting a bus front suspension assembly.

10. A bus suspension mating fixture assembly as recited in claim 9 wherein said means for positioning and supporting a bus front suspension assembly comprises a pair of laterally spaced front wheel locator units.

11. A bus suspension mating fixture assembly as recited in claim 1 further comprising means on said shuttle platform for positioning and supporting a bus rear suspension assembly.

12. A bus suspension mating fixture assembly as recited in claim 11 wherein said means for positioning and supporting a bus rear suspension assembly comprises a pair of laterally spaced rear wheel locator units.

13. A bus suspension mating fixture assembly as recited in claim 1 further comprising a fuel tank bolster locator assembly on said shuttle platform.

14. A bus suspension mating fixture assembly as recited in claim 1 wherein said means for reciprocally moving said shuttle platform into and out of position comprises a pair of power winches fixedly positioned on opposite lateral sides of said shuttle platform, said winches each having a cable attached to a lateral side of said shuttle platform.

15. A bus suspension mating fixture assembly as recited in claim 14 wherein said means for reciprocally moving said shuttle platform further comprises rollers mounted on the bottom of said shuttle platform.

16. A bus suspension mating fixture assembly as recited in claim 15 wherein said means for reciprocally moving said shuttle platform further comprises a plurality of guide plates located beneath said shuttle platform and oriented transversely thereto upon which said rollers travel.

17. A bus suspension mating fixture assembly as recited in claim 16 wherein said guide plates have shock absorber means mounted adjacent each of their opposite ends for cushioning the force of the shuttle platform as it travels to its extreme position.

* * * * *